(12) United States Patent  (10) Patent No.: US 9,083,171 B2
Mundle  (45) Date of Patent: *Jul. 14, 2015

(54) ELECTRICAL GROUND FAULT PROTECTION DEVICE

(71) Applicant: R U Grounded Energy Inc., Calgary (CA)

(72) Inventor: Terry D. Mundle, Cochrane (CA)

(73) Assignee: R U Grounded Energy Inc., Calgary (CA)

( * ) Notice: Subject to any disclaimer, the term of this patent is extended or adjusted under 35 U.S.C. 154(b) by 39 days.

This patent is subject to a terminal disclaimer.

(21) Appl. No.: 13/861,862

(22) Filed: Apr. 12, 2013

(65) Prior Publication Data

US 2013/0228357 A1   Sep. 5, 2013

Related U.S. Application Data

(63) Continuation-in-part of application No. 13/151,138, filed on Jun. 1, 2011, now Pat. No. 8,420,929.

(60) Provisional application No. 61/377,643, filed on Oct. 9, 2010.

(51) Int. Cl.
  *H01R 4/66*  (2006.01)
  *H02G 13/00*  (2006.01)

(52) U.S. Cl.
  CPC . *H02G 13/40* (2013.01); *H01R 4/66* (2013.01)

(58) Field of Classification Search
  USPC .............. 174/6, 3, 5 R, 51, 5 SG, 78; 439/98; 361/799
  See application file for complete search history.

(56) References Cited

U.S. PATENT DOCUMENTS

| | | | |
|---|---|---|---|
| 6,288,327 B1 | 9/2001 | Tobias | |
| 6,490,150 B1 * | 12/2002 | Theisen et al. | 361/673 |
| 6,963,026 B2 | 11/2005 | Brennan | |
| 7,041,895 B1 | 5/2006 | Kim | |
| 7,282,637 B2 | 10/2007 | Stockin et al. | |
| 7,465,874 B2 | 12/2008 | Obleman, Jr. | |

* cited by examiner

*Primary Examiner* — Dhirubhai R Patel
(74) *Attorney, Agent, or Firm* — Donald V. Tomkins

(57) ABSTRACT

A ground fault protection device includes an electrically-conductive main body having downwardly-extending, ground-penetrating electrodes configured for minimal ground penetration. The device has one or more grounding terminals for connection of grounding cables, and may have handles for manual transportation. The device may be installed at a desired field location by applying downward force to the device to press the electrodes into the earth, thereby establishing an electrical connection between the grounding terminals and the ground via the main body and the electrodes. Grounding cables may then be connected between the grounding terminals and structures or equipment requiring grounding. Optionally, the main body may define a reservoir having a plurality of drainage ports. The reservoir may be filled with water, which will drip through the drainage ports and moisten the soil surrounding the electrodes, thereby decreasing the soil's electrical resistance and improving electrical conductivity between the electrodes and the soil.

19 Claims, 5 Drawing Sheets

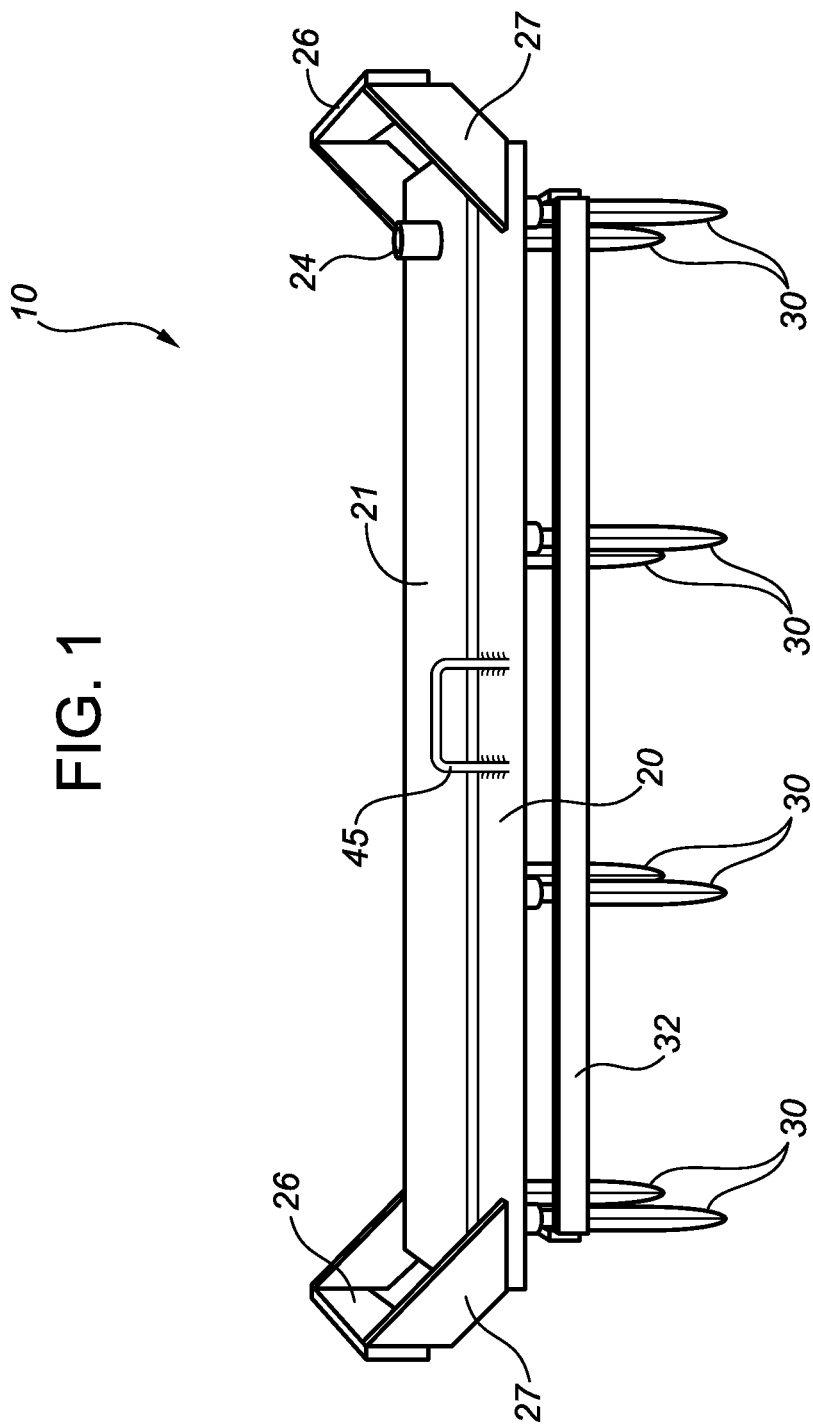

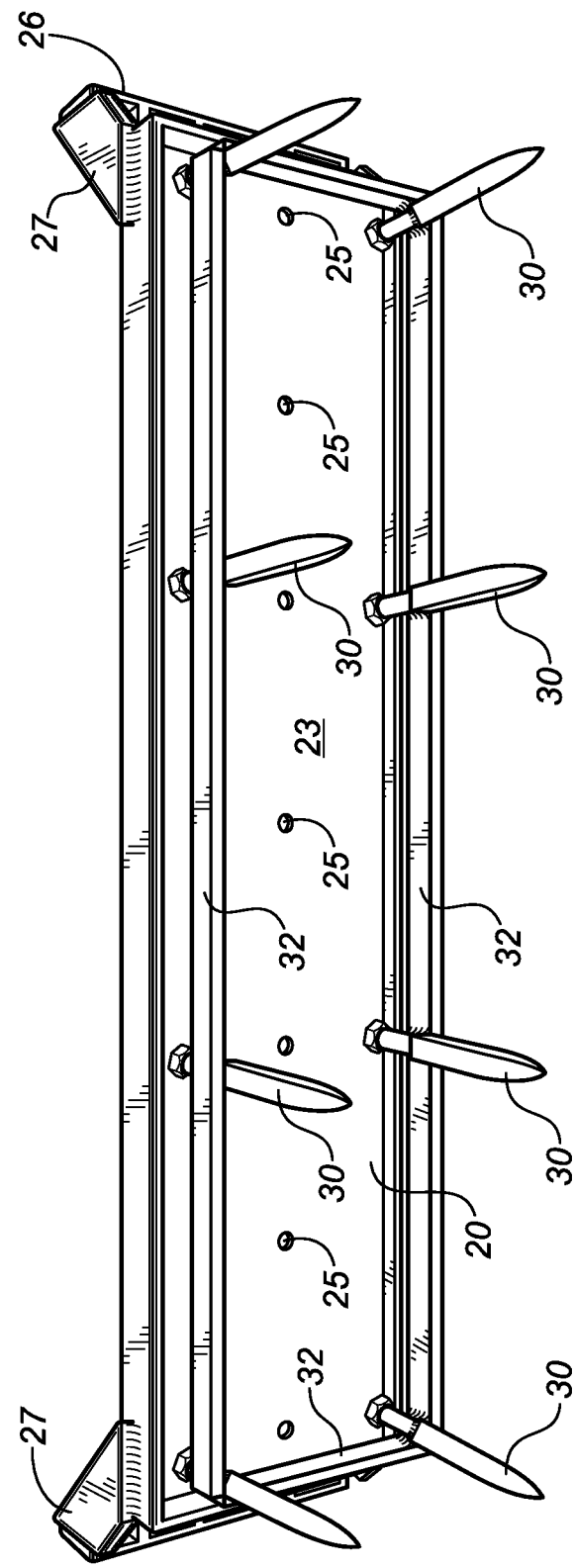

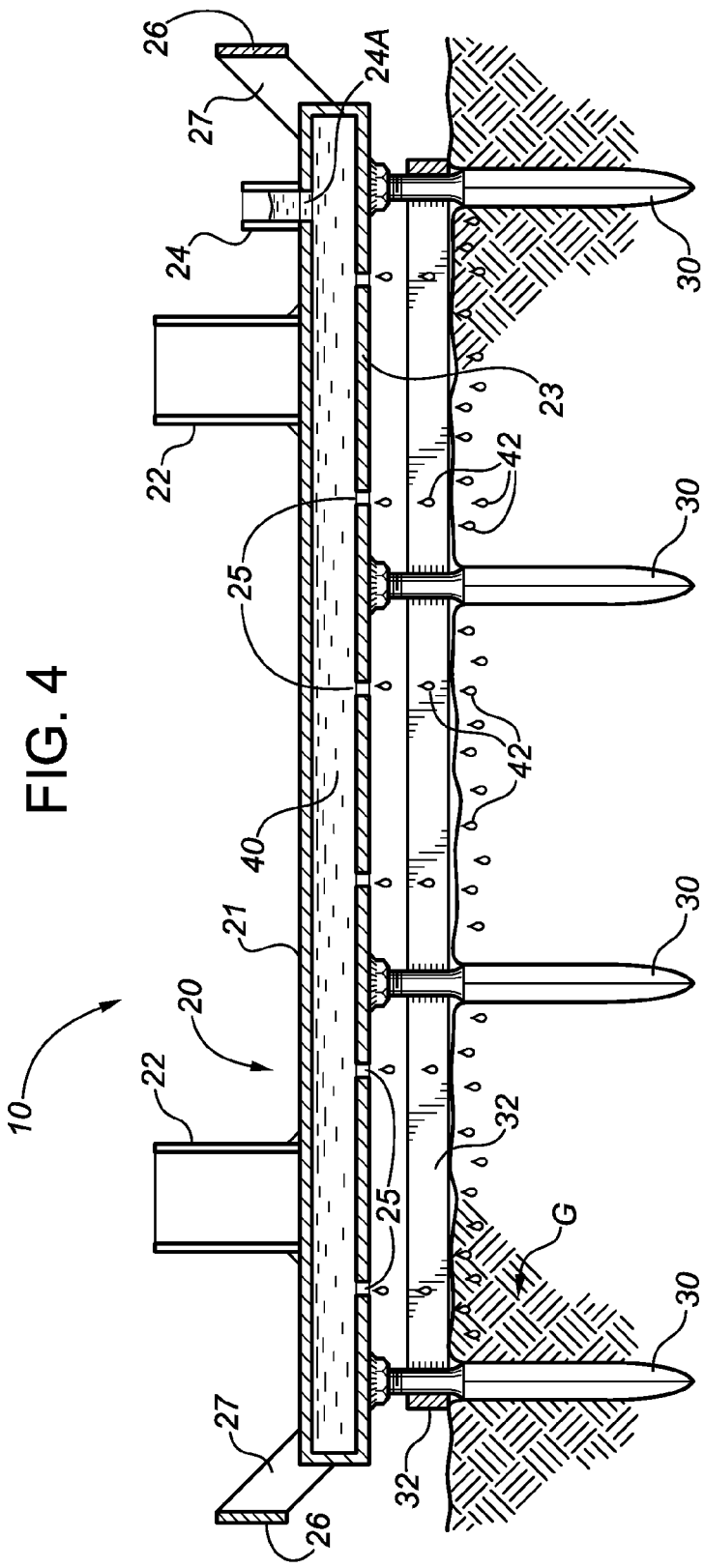

ELECTRICAL GROUND FAULT PROTECTION DEVICE

FIELD OF THE DISCLOSURE

The present disclosure relates in general to electrical ground fault protection (GFP) systems, chiefly but not solely for use in temporary applications. In particular, the disclosure relates to GFP systems and apparatus for use in conjunction with construction, well-drilling, remote dwellings, and other applications where portable electrical generation facilities are employed, and more particularly in applications where it is necessary or desirable to provide ground fault protection for equipment and structures with minimal ground disturbance or ground penetration, and where removal and recovery of GFP devices may be necessary or desirable.

BACKGROUND

Known ground fault protection (GFP) technologies commonly rely on electrically-conductive elements (i.e., electrodes) driven, augered, or buried a significant depth into the ground in order to effectively conduct electrical current into the ground. Such conductive elements, commonly known as earth rods or ground rods, are driven or augered at least 8 feet into the ground to ensure that desired functional effectiveness is achieved. Alternative known GFP technologies use conductive elements in the form of ground mats that conduct electrical current to the ground by contacting the ground over a substantial interface area, with minimal if any ground penetration.

An ideal grounding connection maintains zero voltage regardless of how much electrical current flows into or out of the ground. The electrical resistance of the electrode-to-earth connection determines the quality or effectiveness of the grounding connection. The quality of a grounding connection may be improved in a number of ways, for example: by increasing the electrode surface area in contact with the earth; increasing the depth to which the ground rod is driven or augered (in cases where the electrode is a driven or augered ground rod); using multiple connected electrodes; increasing the moisture content of the soil; improving the conductive mineral content of the soil; and/or increasing the ground surface area covered by the grounding system.

The installation of driven or augered earth rods typically entails the use of specialized rod-driving or augering equipment, and even with the use of such equipment earth rod installation can be difficult due to soil conditions (for example, rock formations close to surface). Even when soil conditions are readily conducive to earth rod installation, the presence of buried utilities (e.g., gas lines, electrical power lines, water lines) can give rise to the risk of personal injury and expensive utility repair costs should such buried utilities be contacted or penetrated by earth rods during the rod installation process. These latter risks can be mitigated or avoided by the use of ground mats not having ground-penetrating elements, but such devices may have less than desired or optimal functional effectiveness.

For the foregoing reasons, there is a need for improved electrical ground fault protection devices that provide effective grounding with minimal penetration of conductive elements into the ground.

BRIEF SUMMARY

The present disclosure teaches a ground fault protection (GFP) device for providing electrical grounding with minimal ground penetration. The GFP device is particularly suitable for temporary grounding in places such as remote well sites where the location of underground services is unknown, and/or where it is necessary or desirable to remove any grounding devices after work at the site (such as well servicing) is completed.

In a first embodiment, the GFP device includes a main body made of an electrically-conductive material (such as carbon steel) and defining a reservoir that can be filled with water. Drainage ports are provided in the main body to allow water to drain from the reservoir at a rate controlled by the size of the drainage ports or by other means. A number of downwardly-extending ground-piercing members (i.e., electrodes) are connected to the main body by electrically-conductive means (e.g., welding or bolting). The number, configuration, and length of the ground-piercing members may be sized to suit specific electrical requirements and site conditions (such as maximum permissible ground penetration).

The GFP device incorporates grounding terminal means for effecting a grounding connection to the GFP device. The grounding terminal means may take any functionally effective form, and GFP devices in accordance with the present disclosure are not limited or restricted to the use of grounding terminal means of any particular form. To provide one non-limiting example, the grounding terminal means may comprise one or more simple posts or loops of steel or other conductive material, connected to the main body or other component of the GFP device so as to be in electrically-conductive communication with the ground-piercing members (electrodes).

Optionally, suitable handles may be provided to facilitate manual lifting and transport of the GFP device. When provided, the handles may optionally be adapted to serve as the grounding terminal means, instead of providing grounding terminal means as a separate and discrete component or components.

After the GFP device has been situated at a desired installation location, downward force is applied to the GFP device as appropriate to press the force the ground-piercing electrodes into the ground, thus establishing an electrically-conductive connection with the ground. This may be done in any suitable fashion, but in one embodiment the GFP device is provided with two or more impact abutments that can be struck with a sledge hammer or other means to drive the electrodes into the ground. In alternative embodiments, the main body of the GFP device may be designed with sufficient structural strength such that the electrodes can be driven into the ground by applying force directly to the main body, such that discrete impact abutments are not required. Persons skilled in the art will appreciate that such alternative embodiments may take a variety of forms in accordance with well-known structural engineering principles, without requiring inventive ingenuity.

To ground a structure or equipment component, a suitable conductive cable is extended between the structure or component and the GFP device's grounding terminal means and electrically connected to both, by any suitable means (such as conventional alligator clips). In situations where conductivity between the electrodes and the ground is less than optimal, due to the particular nature and characteristics (including moisture content) of the soil in which the electrodes have been or are to be installed, water may be added to the GFP device's reservoir such that it will drip into the soil below the GFP device, thereby moistening the soil around the electrodes and improving conductivity therebetween. The addition of water also softens the soil and thereby facilitates installation of the GFP device by reducing physical resistance to penetration of the electrodes. Water may be added periodically to the reservoir as desired or appropriate to maintain or extend the beneficial effects of adding water to the soil in the vicinity of the GFP device.

When the GFP device is no longer needed (such as in temporary installations), it is a simple matter for workers to lift the device out of the ground (using pry bars or other implements if necessary), and then to manually transport the device (using the integral handles, if provided) away from the site as appropriate.

In one alternative embodiment, the main body of the GFP device comprises a solid member (e.g., a solid plate) with top and bottom surfaces and not including a water reservoir. In a further alternative embodiment, the main body comprises a hollow member that is sealed but does not serve as a water reservoir; in this embodiment, the hollow or tubular configuration of the main body is selected for other design purposes (such as to provide desired levels of structural strength and rigidity while minimizing weight).

In variant embodiments of GFP devices in accordance with the present disclosure, the ground-penetrating electrodes may be provided in the form of spikes, castellations, flat sheets, or other shapes, or combinations thereof.

Optionally, GFP devices in accordance with the present disclosure may be provided with bridging bars extending between the ground-piercing electrodes near or slightly below the bottom of the main body. These bridging bars act as stops to prevent excessive ground penetration by the electrodes. As well, they keep the main body at a desired height above the ground surface, which may be beneficial to optimize soil wetting from water dripping out of the reservoir (for GFP devices having a reservoir as in the first embodiment described above). Preferably, the bridging bars will be made of an electrically-conductive material (e.g., steel), such that when the GFP device is installed so as to bring the bridging bars into contact with the ground surface, the bridging bars will provide additional conductivity and thus enhance the effectiveness of grounding connections made using the device. Preferably, the bridging bars will extend across or between the electrodes on all four sides of the GFP device. Alternatively, bridging bars may be provided only between selected pairs or groups of electrodes, while still providing functional benefits as described above.

GFP devices in accordance with the present disclosure may be operated for protection of personnel and equipment on sites where independent electrical generation is employed, at sites where power is provided from a main electrical grid, and/or for ground fault protection against lightning strikes. By way of non-limiting example, industries and sites where embodiments of the GFP device may be advantageously used include construction; mining; drilling and servicing of oil and gas wells; and temporary shelters.

Accordingly, in a first aspect the present disclosure teaches a ground fault protection (GFP) device comprising: a hollow main body defining a reservoir, with an inlet port for introducing water into the reservoir and at least one drainage port for water to drain from the reservoir; a plurality of laterally-spaced ground-penetrating electrodes extending downward from the main body; and grounding terminal means in electrically-conductive communication with the electrodes; with the main body being adapted to receive impact forces and transfer said impact forces to the electrodes such that the electrodes penetrate the ground. Optionally, the device may incorporate handle means to facilitate manual lifting and transportation.

In a second aspect the disclosure teaches a GFP device comprising: a main body; a plurality of laterally-spaced ground-penetrating electrodes mounted to and extending downward from the main body; and grounding terminal means in electrically-conductive communication with the electrodes; with the main body being adapted to receive impact forces and transfer said impact forces to the electrodes such that the electrodes penetrate the ground. Optionally, the device may incorporate handle means to facilitate manual lifting and transportation.

BRIEF DESCRIPTION OF THE DRAWINGS

Embodiments will now be described with reference to the accompanying figures, in which numerical references denote like parts, and in which:

FIG. 1 is a front perspective view of one embodiment of a ground fault protection (GFP) device in accordance with the present disclosure.

FIG. 3 is a bottom perspective view of the GFP device in FIG. 1.

FIG. 4 is a cross-section through the GFP device in FIG. 2.

DETAILED DESCRIPTION

Figure 1A:
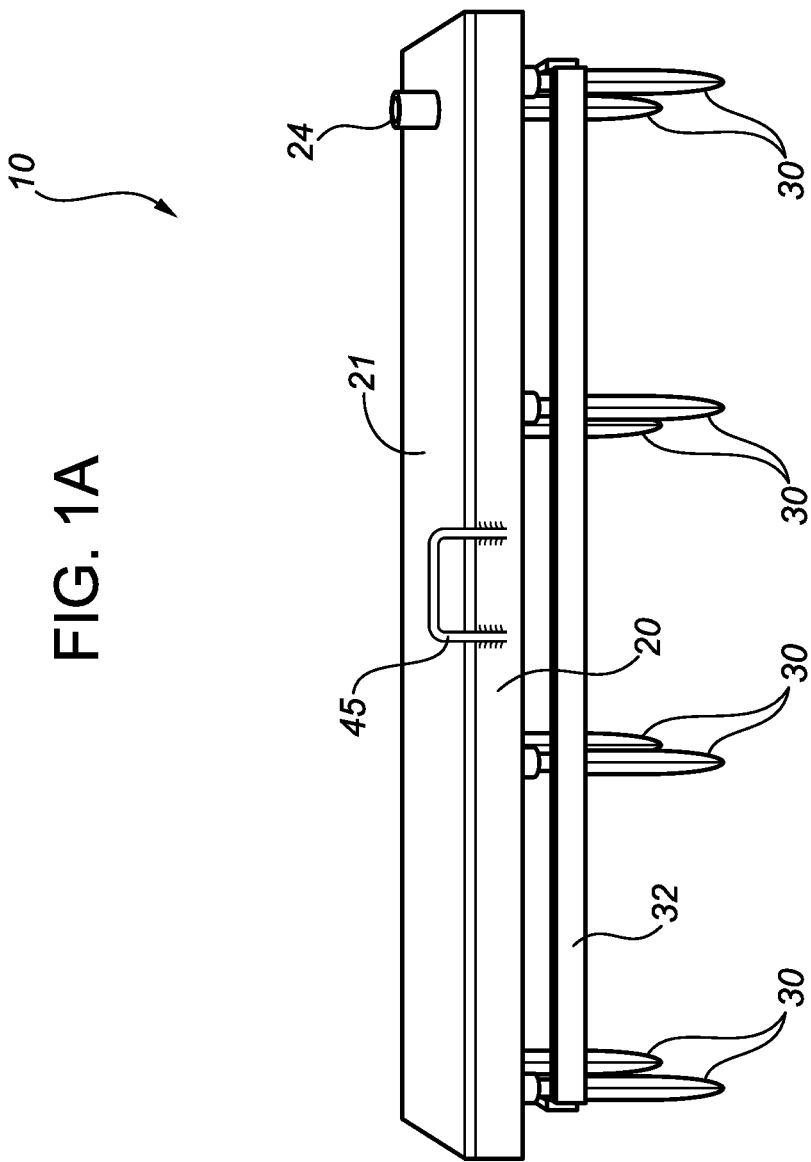
FIG. 1A is a front perspective view of a first variant of the GFP device in FIG. 1, having no handles.

The Figures illustrate embodiments of a ground fault protection (GFP) device 10 in accordance with the present disclosure. In the illustrated embodiments, GFP device 10 comprises a hollow main body 20 made from an electrically-conductive material. Main body 20 has a top plate 21, a top surface 21A, a bottom plate 23, a bottom surface 23A, and defines an internal reservoir 40. A suitable reservoir inlet port 24 (shown by way of non-limiting example as comprising a pipe stub and an associated opening 24A in top plate 21) is provided to allow reservoir 40 to be filled with water. Bottom plate 23 has a plurality of drainage ports 25, which may be provided in any suitable or desired pattern.

A plurality of downwardly-extending, ground-penetrating electrodes 30 are connected to main body 20 by electrically-conductive means (such as welding or bolting). In the illustrated embodiment, main body 20 is of rectangular configuration, and electrodes 30 are arranged in a rectangular pattern generally corresponding to the perimeter of main body 20. However, this is by way of example only; main body 20 could be of various other configurations and electrodes 30 could be arranged in other patterns without material effect on the functionality of GFP device 10. Electrodes 30 are shown as being substantially perpendicular to main body 20, but this is not essential. In alternative embodiments, electrodes 30 could be oriented at a non-perpendicular angle relative to main body 20.

To facilitate installation of GFP device 10 in a desired field location, main body 20 optionally may be provided with one or more impact abutments 22 that can be impacted either manually (such as by a sledge hammer) or mechanically (such as by the bucket of a backhoe or a front-end loader) to force electrodes 30 into the ground G. In the illustrated embodiment, impact abutments 22 are provided in the form of pipe stubs projecting upward from top plate 21 of main body 20. However, this is by way of example only, and impact abutments 22 could be provided in other configurations and in different locations without departing from the scope of the present disclosure. Moreover, alternative embodiments of GFP device 10 could be designed with sufficient structural strength to permit installation by directly impacting main body 20 to force electrodes 30 into the ground G, thus making it unnecessary to provide discrete impact abutments for this purpose.

Optionally, GFP device 10 may include bridging members 32 connected between one or more adjacent pairs of electrodes 30 in upper regions thereof, for purposes explained elsewhere herein. Where provided, one or more of bridging members 32 will preferably (but not necessarily) be made from an electrically-conductive material to establish electrical conductivity between bridging members 32 and electrodes 30.

Optionally, GFP device 10 may be provided with handle means of any functionally suitable type to facilitate manual lifting and transportation. By way of non-limiting example, the embodiments shown in FIGS. 1, 2, 3, and 4 incorporate handle means comprising two handles 26 mounted to main body 20 by means of suitable brackets 27. The locations of handles 26 in these illustrated embodiments are by way of example only; handles 26, when provided, could be could mounted to device 10 in locations other than specifically as illustrated, without departing from the scope of the present disclosure.

Figure 2:
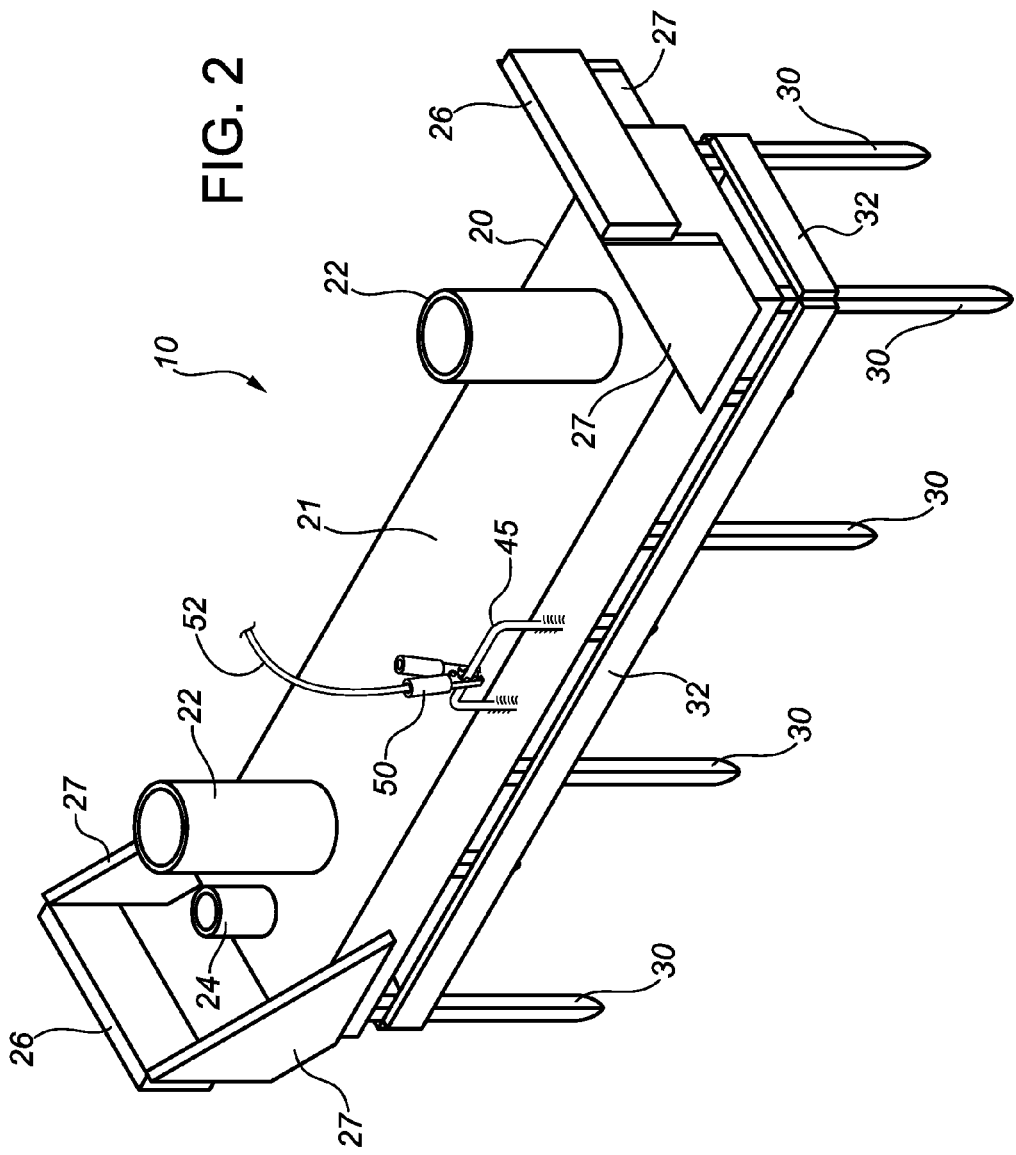
FIG. 2 is an isometric view of a second variant of the GFP device in FIG. 1, incorporating discrete impact abutments projecting from the main body, and shown with a grounding cable connected to the grounding terminal means.

Main body 20 is provided with grounding terminal means to facilitate connection of grounding cables from structures or equipment requiring either temporary or permanent electrical grounding. The grounding terminal means can be provided in any form functionally effective to establish electrical communication with electrodes 30. By way of non-limiting example, the embodiments of GFP device 10 shown in FIGS. 1, 1A, and 2 show grounding terminal means in the form of a grounding terminal 45 in the form of a loop of electrically-conductive metal bar stock welded or otherwise connected to main body 20. Grounding terminal 45 could alternatively be in the form of a simple post or lug made of electrically-conductive metal. As shown in FIG. 2, a grounding cable 52 can be connected to grounding terminal 45 using alligator clips 50 or other electrically-conductive means. Although the embodiments in FIGS. 1, 1A, and 2 are shown with only one grounding terminal 45, mounted in a central location on one side of main body 20, this is by way of non-limiting example only. Grounding terminal 45 could be connected to GFP device 10 in any suitable location, and alternative embodiments could incorporate multiple grounding terminals 45.

In embodiments incorporating handle means, such as handles 26 as shown in FIGS. 1, 2, and 3, handles 26 optionally may be adapted to serve as grounding terminal means, such that a grounding cable 52 can be connected to a selected handle 26 to establish an electrical connection between grounding cable 52 and electrodes 30 via handles 26, brackets 27, and main body 20. Although not shown, suitable insulation materials may be provided on portions of handles 26 to protect against electrical shock in cases where handles 26 also serve as the grounding terminal means (as well as in cases where handles 26 are made of electrically-conductive materials connected to main body 20 but are not intended to serve as grounding terminal means).

Ground-piercing electrodes 30 are illustrated as comprising pointed square bars with threaded ends for connection to nuts welded to the bottom of main body 20. However, this is by way of example only, and GFP devices in accordance with the present disclosure are not limited or restricted to electrodes of any particular configuration or means of connection to main body 20. There is also no restriction or limitation with respect to the length of electrodes 30 or their depth of penetration into the ground.

However, the suitability of a given embodiment of GFP device 10 for specific intended uses may be enhanced by limiting the length of electrodes 30 so as to minimize ground penetration and thus avoiding the need for special measures or approvals that might otherwise be required under government regulations. For example, the Pipeline Act in Alberta, Canada, requires special measures or approvals in connection with any ground disturbance to a depth of 30 centimeters (11¾ inches) or more. With this particular regulatory provision in mind, one particular embodiment of GFP device 10 has electrodes 30 sized and configured for maximum ground penetration of 11½ inches, as measured perpendicular to the ground surface. Other embodiments of GFP device 10 may have shorter electrodes as necessary or desired to suit specific site conditions and/or regulatory requirements, with the number of electrodes being selected as appropriate to provide desired levels of electrical conductivity. By way of non-limiting example, satisfactory grounding effectiveness has been achieved using electrodes 30 sized and configured to limit ground penetration to 7 inches.

When provided, bridging bars 32 help to structurally stabilize electrodes 30 and to prevent deformation of electrodes 30 when they are being driven into the ground G during installation of GFP device 10. In addition, bridging bars 32 can be effective as stops to prevent excessive ground penetration by electrodes 30, while also keeping main body 20 above the ground surface. In addition to facilitating uniform distribution of water dripping into the soil from GFP device 10 and reducing the potential for corrosion, such elevation of main body 20 above the ground surface facilitates manual lifting of embodiments of GFP 10 that do not incorporate handle means, and also facilitates dislodgement of GFP 10 from the ground by means of pry bars, fork lift, or other tools or equipment.

As well, bridging bars 32, when made from an electrically-conductive material, can enhance the overall grounding effectiveness of GFP device 10 by virtue of the incremental conductive ground contact provided by bridging bars 32. In embodiments not having bridging bars, GFP device 10 may be installed such that main body 20 is in direct contact with the ground, thereby providing supplemental electrical conductivity with the ground, over and above that provided by electrodes 30.

Using a GFP device 10 in accordance with the illustrated embodiments, the effectiveness of a grounding connection can be enhanced by filling reservoir 40 with water, such that water will drip onto the ground through drainage ports 25 in bottom plate 23 of main body 20, as graphically represented by water drops 42 in FIG. 4. This is because the electrical conductivity of soil generally can be increased by the addition of moisture, due to a resultant decrease in the soil's electrical resistance. Table 1 below, which is derived from the inventor's experimental test results, illustrates the increased grounding effectiveness of GFP devices in accordance with the present disclosure (as evidenced by reduced electrical resistance), as compared to known GFP devices:

TABLE 1

| GFP Device | Measured Resistance - Dry Ground | Measured Resistance - Wet Ground |
| --- | --- | --- |
| Standard 8-foot ground rod | 90 ohms | 30 ohms |
| Plate-type ground mat | 98 ohms | 56 ohms |
| GFP device per disclosure (with 8-inch ground penetration) | 30 ohms | 15 ohms |

In general, the lower the resistance value, the more effective the ground fault protection device will be. Accordingly, and as may be understood from Table 1, GFP devices in accordance with the present disclosure provide improved ground fault protection over existing devices, with the additional benefit of leaving minimal evidence of the devices' prior presence after removal from site.

In embodiments of GFP device 10 having a reservoir 40, the rate at which water 42 flows out of reservoir 40 will be determined in part by the number and size of drainage ports 25. Persons skilled in the art will readily appreciate that GFP device 10 can be modified to provide flow restriction means to regulate or meter water flow through one or more of drainage ports 25, and alternative embodiments having such flow restriction means are intended to come within the scope of the present disclosure. Flow restriction means for this purpose could comprise screens, slide gates, removable plugs, or any other suitable means within the knowledge of persons skilled in the art.

Although GFP device 10 may have a reservoir 40 and drainage ports 25 as in the illustrated embodiment, this is not essential. In alternative embodiments, main body 20 could be provided in the form of a solid member such as a plate or a structural frame of any suitable configuration, without incorporating or having an associated reservoir. Main body 20 could also comprise a hollow member but without means for filling the hollow interior with water, such that the hollow interior does not function as a reservoir. Such alternative embodiments, in which main body 20 does not incorporate a reservoir, will not incorporate inlet port 24 shown in the illustrated embodiments. Moreover, in GFP devices that do have a water reservoir, it is not essential that the soil-wetting utility provided by such embodiments be implemented in all uses or applications, as the need or desirability of implementing that utility will vary according to site conditions (including but not limited to soil type and existing soil moisture content).

In preferred embodiments, GFP device 10 has a total weight such that it can be manually lifted and transported by two workers without great difficulty. This of course will be a function of the strength of the particular workers lifting and carrying the device. However, without stipulating or suggesting specific weight limits, GFP device 10 in a particularly preferred embodiment has a total weight of approximately 25 to 35 pounds, which can be easily carried by a couple of workers, even for embodiments of GFP device 10 that do not incorporate discrete handle means.

In a variant embodiment of GFP device 10, electrodes 30 are electrically isolated from main body 20, such that direct contact with main body 20 does not present an electrical shock hazard. For example, the required electrical connection between the grounding terminal means and electrodes 30 could be provided by an insulated cable extending directly between the grounding terminal means and the electrodes, or between the grounding terminal means and conductive elements (such as bridging bars) connected to the electrodes, thus by-passing main body 20. In such variant embodiments, main body 20 does not need to be made from an electrically-conductive material, but electrodes 30 will still be structurally connected to main body 20 by suitable means such that electrodes 30 will penetrate the earth surface in response to impact forces applied to main body 20 or associated impact abutments 22.

In one alternative embodiment, main body 20 could be made from an electrically-conductive material but with the electrical connection between the grounding terminal means and electrodes 30 by-passing main body 20 as described above. In this embodiment, the required structural connection between electrodes 30 and main body 20 will preferably incorporate electrical isolation means to prevent electrical current flowing to main body 20 while at the same time providing a sufficient structural connection between electrodes 30 and main body 20. Persons skilled in the art will appreciate that this result can be accomplished in a variety of ways using known means (for example, by bolting electrodes 30 to main body 20 using non-conductive bolts in conjunction with insulating washers).

It will be readily appreciated by those skilled in the art that various alternative embodiments of the disclosed GFP device may be devised without departing from the scope of the present teachings, including modifications that may use equivalent structures or materials subsequently conceived or developed. It is to be especially understood that GFP devices in accordance with the disclosure are not intended to be limited to any described or illustrated embodiment, and that the substitution of a variant of a claimed element or feature, without any substantial resultant change in the working of the device, will not constitute a departure from the scope of the disclosure. It is also to be appreciated that the different teachings of the embodiments described and discussed herein may be employed separately or in any suitable combination to produce desired results.

In this patent document, any form of the word "comprise" is to be understood in its non-limiting sense to mean that any item following such word is included, but items not expressly mentioned are not excluded. A reference to an element by the indefinite article "a" does not exclude the possibility that more than one such element is present, unless the context clearly requires that there be one and only one such element. Any use of any form of the words "connect", "engage", "couple", "attach", or any other term describing an interaction between elements is not intended to limit that interaction to direct interaction between the subject elements, and may also include indirect interaction between the elements such as through secondary or intermediary structure.

In this document, the terms "ground" and "earth" are both used with express or implicit reference to the physical earth or soil. In addition, the term "ground" is used in both noun and verb forms with reference to electrical grounding and electrical ground connections. The intended meaning of any form of the word "ground" in a given instance will be readily apparent to persons skilled in the art having due regard to the context in which it is used.

What is claimed is:

1. A ground fault protection (GFP) device comprising:
   (a) a main body having a top surface and a bottom surface;
   (b) a plurality of laterally-spaced electrodes mounted to and extending downward from the main body, said electrodes being configured for penetration into the ground;
   (c) grounding terminal means in electrically-conductive communication with the electrodes; and
   (d) one or more impact abutments projecting upward from the main body, and adapted such that when the GFP device is positioned on the ground, the application of impact forces to the impact abutments will cause the electrodes to penetrate the ground.

2. GFP device as in claim 1 wherein the main body is made from an electrically-conductive material, and wherein the grounding terminal means and the electrodes are physically connected to and in electrically-conductive communication with the main body, such that the electrically-conductive communication between the grounding terminal means and the electrodes is effected through the main body.

3. A GFP device as in claim 1, further comprising handle means, wherein the grounding terminal means is integral with the handle means.

4. A GFP device as in claim 1 wherein the electrodes are substantially perpendicular to the bottom surface of the main body.

5. A GFP device as in claim 1 wherein each electrode extends below the main body a distance not exceeding 11.5 inches, as measured perpendicular to the bottom surface of the main body.

6. A GFP device as in claim 1, further comprising a bridging bar extending between at least one adjacent pair of electrodes, adjacent to and substantially parallel to the bottom surface of the main body.

7. A GFP device as in claim 6 wherein each electrode extends below the bridging bar a distance not exceeding 11.5 inches, as measured perpendicular to the bottom surface of the main body.

8. A GFP device as in claim 1 wherein the main body comprises a solid member.

9. A GFP device as in claim 1 wherein the main body comprises a hollow member.

10. A ground fault protection (GFP) device comprising:
   (a) a hollow main body having a top plate with a top surface and a bottom plate a bottom surface, said main body defining a reservoir and having:
      a.1 an inlet port whereby water can be introduced into the reservoir; and
      a.2 one or more drainage ports whereby water can drain from the reservoir;
   (b) a plurality of laterally-spaced electrodes mounted to and extending downward from the main body, said electrodes being configured for penetration into the ground; and
   (c) grounding terminal means in electrically-conductive communication with the electrodes;

wherein said main body is adapted such that when the GFP device is positioned on the ground, the application of impact forces to the main body will cause the electrodes to penetrate the ground.

11. A GFP device as in claim 10 wherein the main body is made from an electrically-conductive material, and wherein the grounding terminal means and the electrodes are physically connected to and in electrically-conductive communication with the main body, such that the electrically-conductive communication between the grounding terminal means and the electrodes is effected through the main body.

12. A GFP device as in claim 10, further comprising one or more impact abutments associated with the main body.

13. A GFP device as in claim 10, further comprising handle means, wherein the grounding terminal means is integral with the handle means.

14. A GFP device as in claim 10 wherein the electrodes are substantially perpendicular to the bottom surface of the main body.

15. A GFP device as in claim 10 wherein each electrode extends below the main body a distance not exceeding 11.5 inches, as measured perpendicular to the bottom surface of the main body.

16. A GFP device as in claim 10, further comprising a bridging bar extending between at least one adjacent pair of electrodes, adjacent to and substantially parallel to the bottom surface of the main body.

17. A GFP device as in claim 16 wherein each electrode extends below the bridging bar a distance not exceeding 11.5 inches, as measured perpendicular to the bottom surface of the main body.

18. A GFP device as in claim 10, further comprising flow restriction means associated with at least one of the drainage ports.

19. A GFP device as in claim 10 wherein the total weight of the device is between approximately 25 pounds and approximately 35 pounds.

* * * * *